United States Patent [19]

Cheng et al.

[11] 4,298,729
[45] Nov. 3, 1981

[54] XANTHAN GUM-MODIFIED STARCHES

[75] Inventors: Hsiung Cheng; Peter Wintersdorff, both of San Diego, Calif.

[73] Assignee: Merck & Co., Inc., Rahway, N.J.

[21] Appl. No.: 42,663

[22] Filed: May 25, 1979

[51] Int. Cl.$^3$ .................... A23L 1/195; A23L 1/189; C08L 3/04

[52] U.S. Cl. .................... 536/102; 106/205; 426/579

[58] Field of Search .................... 106/205; 536/102; 426/579

[56] References Cited

U.S. PATENT DOCUMENTS

| | | | |
|---|---|---|---|
| 3,721,571 | 3/1973 | Glicksman et al. | 426/579 |
| 3,821,428 | 6/1974 | Farkas | 426/559 |
| 3,930,871 | 1/1976 | Starace | 106/205 |
| 4,058,636 | 11/1977 | Igoe | 426/578 |
| 4,081,567 | 3/1978 | Haber | 426/528 |
| 4,105,461 | 8/1978 | Racciato | 106/205 |
| 4,192,900 | 3/1980 | Cheng | 426/579 |

FOREIGN PATENT DOCUMENTS

1940655 8/1978 Fed. Rep. of Germany.

OTHER PUBLICATIONS

Chem. Abs. 91-18648(3) "Starch-Xanthan Compositions" Christianson et al. Publish Date 4-27-1979.
Chem. Abstr. 89, 1978, p. 487, ref. 195752q.
Glicksman, M., "Gum Technology in Food Industry", pp. 292-293, Academic Press, 1969.
"Food Dehydration" editor Van Arsdel AVI publish. 1973, Chapter V Air Drying & Drum Drying, Brown et al., pp. XI and 82-85.
NTIS "Low Temperature Food Thickner" PB 272384 S. N. 785614 Christianson et al. 4-7-77.

*Primary Examiner*—Paul Lieberman
*Assistant Examiner*—Herbert J. Lilling
*Attorney, Agent, or Firm*—Gabriel Lopez; Hesna J. Pfeiffer

[57] ABSTRACT

A novel form a starch (e.g., root, root-like, cereal, or blend thereof) modified by xanthan gum is disclosed. The xanthan gum-modified starches exhibit properties similar to those of chemically-modified pregelatinized starches. Xanthan gum-modified starches are characterized by increased acid stability, by heat and shear stability, and by increased resistance to dissolution in aqueous media. The novel process by which this novel starch is made comprises: heating to gelatinize an aqueous starch-xanthan gum blend below 100° C., continuing heating to reduce the moisture content to about between 5 and 10%, then further drying the mixture (typically to below 7% moisture) above 100° C. long enough to cause interaction between the starch and xanthan gum. Drum drying is the preferred heating method that combines the heating and drying steps.

1 Claim, No Drawings

XANTHAN GUM-MODIFIED STARCHES

BACKGROUND OF THE INVENTION

Starches have been used for many years in the food industry to provide processed foods with improved product appearance and increased consumer appeal. Starches can impart desired properties to food products ranging from shape retention and sliceability in puddings made with pregelatinized starch to good grain and pulpy texture in sauces and gravies made with pregelatinized texturized starches.

The diversity in processed foods has created the need for starches exhibiting specific properties in specialized applications. The sources of starch include: roots (e.g., potato), root-like or tuber plants (e.g., tapioca), and cereals (e.g., corn or wheat). These starches when used in processed foods may be categorized as unmodified (generally in granular state), modified (chemically-modified starch generally retaining granular integrity), pregelatinized modified starches, or pregelatinized texturized starches. Unmodified starch is rarely used for its ability to swell and form a viscous paste (i.e., to gelatinize) because unmodified starch is known to be unstable with respect to granule breakdown (degradation or dissolution). Unmodified starches thus have desirable effects on product quality including gummy or slimy texture when gelatinized in water; unstable paste viscosity on cooking or when subjected to shearing action of pumps, agitators, colloid mills, etc; and gelling of an overcooked paste upon cooling.

Chemical modification is used to improve the properties of unmodified granular starch. The modified starches remain in the granular form (i.e., they are not discrete bulky particles as in pregelatinized starches). Modified starches must possess sufficient consistency so that they will resist degradation of the granules by heat and/or shear.

A particular type of modification that has found great utility in the food industry and the other industries has been designated cross-linked starch. This chemically modified starch type is conceptualized as the toughening of the starch granule. The benefit of these cross-linked starches is that when they are heated in water they swell but the swollen granules remain intact.

A major drawback associated with chemical cross-linking is the progressively decreasing swelling power of the starch granules with increasing crosslinking; the ultimate level of crosslinking being characterized by creation of a starch which is a resistant to gelatinization; i.e., that has no swelling power.

Preparation of pregelatinized starches involves chemical modification of starch granules, subsequent gelatinization in hot water usually above the particular starch's gelatinization temperature (the preferred gelatinization and drying process is drum drying), swelling, bursting of the granules, and drying and milling into a fine-mesh product. The resulting product easily swells in water forming a relatively smooth paste similar in texture to pie filling (i.e., not whole, intact starch granules). On the other hand, a coarse mesh product creates another category of texturized starches, i.e., starches that find utility where the desired food product consistency is pulpy or grainy as in spaghetti sauce or apple sauce (i.e., the particles are not whole, intact granules).

Chemical modifications to produce texturized starches have, in general, the major drawback of difficulty in controlling the degree of crosslinking. Undercrosslinking results in products that are not stable to heat, acid, or shear; are lacking sufficient texture and binding power; and exhibit high swelling power and associated gummy or slimy texture. Conversely, over-crosslinking results in products with insufficient swelling power which require heat for hydration. Most commercial products are slightly overcrosslinked to provide balance for texture, stability, and swelling power.

All of these starches can be used as precursors to be reacted with xanthan gum under the inventive conditions. When this invention uses the term "starch", all food starches in all forms are meant.

Xanthan gum is an exocellular polysaccharide produced by the microorganism *Xanthomonas campestris* by well known processes. KELTROL F® is commercially available food grade xanthan gum from Kelco, San Diego, California.

Patent application Ser. No. 785,614 filed April 7, 1977 (U.S. Dept. of Commerce, NTIS Publication PB-272,384 describes a xanthan gum and starch composition used as a low-temperature thickener for jellies, puddings, and similar foodstuffs. This process is highly dependent on xanthan gum's ability to allow free starch constituents to diffuse from unmodified granular starch in an aqueous medium at pH 3.0. to 10.0 and at 25° to 90° C. The resulting mixture when dried to a powder is taught to be readily soluble in both hot and cold water and stable at pH 3.0 to 10.0. The viscosity of the xanthan gum/unmodified starch mixture is shown to be unaffected by the drying process; thus this step was not viewed as integral to free-starch diffusion from the granules. The end product of this process was suggested for use in foodstuffs where improved gelation properties are desired and a smooth jelly-like texture is desired.

It is apparent, then, that the idea of using xanthan gum and starch together in food and other industrial applications is not new. What is one crux of this invention is discovery of a process that enables a novel xanthan gum-modified starch composition to be produced in which the xanthan gum functions as a starch modifier (analogous to a chemical-crosslinking agent) but whose functionality is not restricted by the type of presursor starch used. The end products are uniquely characterized by increased resistance to dissolution in water, by increased acid stability, and by heat and shear stability. These characteristics have previously generally been associated only with pregelatinized modified starches or with pregelatinized texturized starches.

PREFERRED EMBODIMENTS OF THE INVENTION

One embodiment of this invention is novel forms of starches which have been modified by xanthan gum. These novel xanthan gum-modified starches exhibit acid stability, heat and shear stability, and resistance to dissolution in aqueous media; i.e., the gum-modified starches of this invention show an increase in these properties when compared to the corresponding precursor starches or to simple mixtures of the precursor starches with xanthan gum.

Another embodiment of this invention is a process comprising drying (preferably on a drum dryer) an aqueous mixture of xanthan gum and gelatinized starch above 100° C. (preferably above 140° C.) so as to cause a modification of the precursor starch by the xanthan gum. The maximum drying temperature is limited by the decomposition temperature of the precursor starch.

Typically 204° C. is the maximum drying temperature. The process enables xanthan gum to function as a modifier, binder, or texture modifier, demonstrated to protect the integrity of the starch used, while simultaneously imparting heat and shear stability without introducing the problem of increased gelation and limited swelling power.

The relative amounts of xanthan gum and precursor starch used are not critical to this invention, within a broad range of 1 part of xanthan gum to 1 to 100 parts of precursor starch. Particularly preferred ratios include 1 part of xanthan gum to 5 to 50 parts of precursor starch. The exact choice depends on the desired properties of the modified starch end product.

The two components are added to water preferably by first dissolving dry xanthan gum in water, then adding precursor starch to the xanthan gum solution thereby prepared; although the order of addition can be varied for convenience.

The amount of water used is not critical, but is limited by practical factors, such as the viscosity of solution and desired time necessary in the final drying step. Generally, the amount of water used is such that the xanthan gum is present at about 0.5-5% (weight basis) preferably about 1-3% (weight basis) and precursor starch is added according to the desired xanthan gum:starch ratios.

Mixing of these components is continued until a homogenous solution has been achieved. Solution time can be shortened, if necessary, by heating gently, generally at a temperature under 100° C.

Once a homogenous solution has been accomplished, this solution is first gelatinized and then dried to less than about 10% moisture through suitable heating equipment. At this point, the mixture can have the appearance of a dry powder. The xanthan gum and precursor starch mixture is then dried further at a drying temperature between about 100° C.–204° C. to cause interaction between xanthan gum and the precursor starch; preferably between about 138°–177° C.

The preferred process combines all the heating and drying steps together by using a commercial drum dryer equipped with steam heat. On such a machine the RPM's of the drum can be adjusted to control the residence time of the starch/gum solution during the critical >100° C. period. One common commercial drum dryer operates at about 165°–171° C. and at psig of 100–110.

The mixture is dried in the drum dryer until less than about 7% moisture is in the final product, or preferably from about 2-7%. Selection of the exact end-point is clearly dependent on the precise modified starch properties desired. Generally, under the preferred conditions of this invention, drying time can be as little as about 15-20 seconds, but can be longer than 2-3 minutes.

As a critical precursor starch-to-gum interaction takes place in the final drying stage, i.e, above 100° C., it is apparent to one skilled in the art that low drying temperatures generally would require longer drying time whereas higher temperatures, require short times. Other parameters such as the gum to starch ratio or the kind of precursor starch used would also affect the temperature or time required to achieve a desired product. Likewise, the properties desired in the end product would determine the choice of temperature, time, and precursor starch chosen.

Although a drum dryer is the best apparatus for conducting this inventive process, other drying methods, e.g., an oven, can be used provided the desired temperature can be achieved. The dried modified-starch product is then milled to a desired mesh size. For most food purposes, powders of 8-325 mesh are suitable. The modified-starch product can be used in known systems following hydration either in water or water-containing media such as juices and in subsequent processing. Illustratively, by gelatinizing and co-drum drying an aqueous xanthan gum, unmodified tapioca starch mixture in a 1:5 weight ratio milled to a desirable particle size above 200-mesh (e.g., through 14-mesh, on 20-mesh), the finished product exhibits a rapid hydration rate in water to form pregelatinized, texturized, swollen particles having a firm and crispy texture. Commercially pregelatinized, texturized starches (usually slightly overcrosslinked) generally lack rapid hydration rates and require heating because of the high degree of crosslinking. Although these commercial pregelatinized, texturized starches are grainy and pulpy, they are not as firm and crispy in texture compared to the xanthan gum-modified tapioca starch product of this invention. The drumdried xanthan gum-modified starch exhibits excellent swelling power and is also superior in heat and shear stability to any of the chemically modified, pregelatinized, texturized starch products presently available. As a demonstration of its heat and shear stability, this product can be stirred in boiling water for one hour and still remain crispy and maintain its integrity.

The fine-mesh products (through 200-mesh) produced by changing the xanthan gum, unmodified tapioca starch ratio from 1:5 to 1:25 or 1:50 function similarly to high viscosity, pregelatinized, chemically modified tapioca starches. The pastes have a smooth and short texture with good heat and shear stability comparable to crosslinked starch pastes. By heating these products for longer times at higher temperatures, the effectiveness of xanthan gum in these products can be increased to lower the cost of using the xanthan gum, if so desired.

Other starches (unmodified corn, unmodified waxy maize, chemically modified waxy maize starch) also react with xanthan gum in a similar way, but the texture, stability, etc., are different, as expected by virtue of each starch's individual characteristics. Thus, the characteristics of the end product are a function of the characteristics of the individual precursor starches.

It is significant to note that blends of gums containing xanthan gum as an essential component (e.g., xanthan gum and locust beam gum) also impart to starch the desirable characteristics heretofore attributed to pregelatinized chemically modified starches. In addition to variations of starch types, the effect of previous modification to the precursor starch (e.g., chemical modifications) was also determined. To test the interaction of xanthan gum with more highly crosslinked modified starches, it is necessary to increase the temperature/time variables to enable an interaction to occur.

The effectiveness of the xanthan gum-starch interaction is dependent not only on the amount of xanthan gum used (e.g., changing the xanthan gum-to-starch ratio from 1:5 to 1:25 or 1:50), but also on the temperature and heating time maintained during the drying process. The effectiveness of the interaction may be judged by the heat and shear stability, the swelling power, and the overall crosslinked-like characteristics including texture and freeze-thaw stability, etc., of the final product.

Changes in temperature can greatly influence the interaction between xanthan gum and precursor starches in addition to the changes effected by varying the amount of xanthan gum added. It is apparent that increasing temperatures and reaction time can influence the extent of the interaction between precursor starches and xanthan gum and that many heat- and shear-stable products with crosslinked-like characteristics can be produced. It should also be apparent to those skilled in the art that moderately crosslinked starches could interact with xanthan gum at higher temperatures to produce starch compositions with characteristics of extensively crosslinked, chemically modified starches used in texturized starch applications.

From the principles of operation expressed in the preceding discussion, those skilled in the art will be able to utilize this invention in operations which may differ from those specifically described; for example, with respect to the type or precursor starch modified, the degree of chemical modification and processing of the precursor starch, the ratio of xanthan gum to precursor starch, the variation in drying temperature range and in time, and the amount of the xanthan gum-modified starch used in a particular application. All products should thus be produced taking into consideration all of these variables and the intended end use of the xanthan gum-modified starch product.

The modified starches of this invention can be used in many food applications. Various products of this invention have been formulated into tomato sauce mix, applesauce mix, instant dry mix vanilla pudding, instant imitation jelly, lemon pie filling, French type dressing, and improved textured vegetable proteins or meat extenders. Other food uses include soups, spaghetti sauces, fruit drinks, meat sauces, gravies, and tapioca desserts, or instant foods. As such, they are used in the same manner as commercially available pregelatinized modified starches.

In addition, there are many non-food, or industrial applications for the modified starches, such as in paper coatings, textile printing pastes, and various oil-field applications. In these applications the gum-modified starches of this invention can be used like the known chemically modified and pregelatinized modified and texturized starches.

The present invention is hereinafter illustrated by reference to specific examples. It is understood that such examples are presented to provide a further understanding as to the uses and the advantages of the invention and should not be construed as limiting the scope of the invention as set forth in the claims.

TESTS AND MEASUREMENTS USED IN EXAMPLES

Test 1. Viscosity—a measure of shear stress, shear rate relationships; in essence, the thickness of a solution. Measurements were made on:
  a. Brookfield LVF viscometer
  b. Helipath Viscometer Test 2. Cold Water Hydration Rate and Swelling Power Test—a measure of how much water the modified starch can take up. The following procedure was used:
  a. 10 g gum/starch dried product (through 20-mesh, on 28-mesh) dispersed in beaker containing 300 ml of deionized water at 24° C. with slow agitation on a Lightnin mixer (slow speed).
  b. Mixture agitated for 5 minutes.
  c. Placed on 20-mesh screen, washed with 1000 ml cold (24° C.) water.
  d. Drained for 2 minutes.
  e. Residue on screen weighted to determine hydrated product weight.

Test 3. Heat and Shear Stability—a measure as to how well the modified starch will retain its particle integrity under conditions of sustained heat and shear commonly found in food and industrial applications. The following procedure was used:
  a. To 300 ml of boiling deionized water in a hot cup, add 10 g of gum/starch dried product (through 14-mesh, on 20-mesh) with slow agitation of Lightnin mixer.
  b. Reduce to "low heat" setting of hot cup and continue boiling and agitation for 15 minutes.
  c. Pour product on a 20-mesh screen and wash with 1000 ml cold (24° C.) water.
  d. Drain for one minute.
  e. Residue on screen weighed to determine product weight.

Note: Tests 2 and 3 are similar measurements of retained residue weight on screen with Test 3 identifying particle degradation, if any, by reduced residue retained on the screen.

EXAMPLE 1

Basic Procedure for Preparing Xanthan Gum/starch Solution and Subsequent Drying Procedure (A) To prepare 1 liter of 1:5 ratio of gum:starch solution:
  1. Slowly add 20 g gum to 880 ml of deionized water while stirring with high agitation on a Lightnin Mixer, high speed.
  2. Mix for 5 to 10 minutes or until all gum particles have hydrated.
  3. Slowly add 100 g of precursor starch to gum solution and mix until well dispersed.

To prepare drum-dried gum/starch:
  1. Pour approximately 250 ml of above solution on drums of a Buflovak Laboratory Atmospheric double-drum dryer, at 40–50 psi steam pressure 141° to 147° C., 1 rpm. The solution is in the drum dryer for about 20–90 seconds.
  2. Mill and screen dried product to proper mesh size. The mesh sizes usually required are: through 14-mesh and on 20-mesh; through 20-mesh and on 28-mesh; and through 200-mesh, a fine-mesh product.

(B) To prepared 1:25 ratio of gum:starch solution, follow steps in (A) by hydrating 10 g gum in 740 ml water and then adding 250 g precursor starch to gum solution. All other steps remain the same as (A).

(C) To prepare 1:50 ratio of gum:starch solution, follow steps in (A) by hydrating 10 g gum in 700 ml water and then adding 500 g precursor starch to gum solution. All other steps remain the same as (A).

* It should be noted that the preferred drying method is drum drying as the design of the revolving drums facilitates gelatinization of the gum/starch while the solution is held between the drums and before the solution feeds through the revolving drum's cycle. If other drying methods, such as oven drying, are used then an additional heating step is necessary to allow the gelatinization of the gum/starch solution.

EXAMPLE 2

A 1:5 ratio of xanthan gum-unmodified tapioca starch was prepared as in Example 1, (A). The resulting xanthan gum-modified tapioca starch was compared with commercially available Redi-Tex Starch a pregelatinized modified texturized starch to determine the cold water hydration rate and swelling power and the heat and shear stability of each starch product. The results indicated that the modified starch of Example 1, (A) had the same or better general properties as the commercially available, texturized starch.

TABLE I

Cold Water Hydration Rate & Swelling Power
(Test 2)

| Description of Drum Dried Product | Hydrated Product Retained on 20-mesh Screen | Comments |
| --- | --- | --- |
| Redi-Tex starch thru 14-mesh, on 20-mesh (A. E. Staley Mfg. Co.) | 104 g | Semi-firm large granules, mushy texture, no gel formation, good hydration and dispersion rate. |
| Xanthan gum-modified tapioca starch, 1:5 ratio thru 14-mesh, on 20-mesh thru 20-mesh, on 28-mesh | 188 g  168 g | Firm granules, firmer than starch, fast dispersion and hydration rate. Applesauce-like appearance, not mushy. Appearance of pregelatinized crosslinked texturized starch. |

TABLE II

Heat and Shear Stability Test
(Test 3)

| Description of Drum Dried Product | Hydrated Product Retained on 20-mesh Screen | Comments |
| --- | --- | --- |
| Redi-Tex starch, thru 20 on 28-mesh | 90 g | Starch partially soluble, did not retain a lot of water, crisp apple sauce texture, individual particles slightly mushy. |
| Xanthan gum-modified tapioca starch (1:5 ratio, thru 20 28 mesh) | 200 g | More heat and shear stable than Redi-Tex starch. Partially solubililized; hydrated more than starch. Retained more water, crisper particles than starch, softer appearance, more applesauce like texture appearance. Appearance of pregelatinized crosslinked texturized starch. |

The 1:5 ratio of xanthan gum:unmodified tapioca starch prepared as in the preceding formulation is useful in the following formulation, which usually requires a pregelatinized, crosslinked starch (i.e., texturized starch).

| Tomato Sauce Mix | |
| --- | --- |
| Ingredients | Weight (g) |
| Tomato paste | 177.0 |
| Water | 305.7 |
| Drum-dried xanthan gum, unmodified starch (through 20- on 28-mesh) | 14.5 |
| Sugar | 14.5 |

Slurry all ingredients together and let stand. The tomato sauce mix pH=4.3.

The xanthan gum-modified starch was tested in the cooked and uncooked form to determine its utility.

(1) The drum-dried, xanthan gum-modified tapioca starch product was added to the above formulation and kept in the refrigerator for at least 120 minutes. The measured viscosity=3500 cP*. The appearance of the tomato sauce was as follows:
 a. good pulpy texture
 b. minimal syneresis on standing
 c. white xanthan gum-modified tapioca starch particles absorbed some red color from tomato paste
 d. slightly more watery than (2) below, but overall good appearance.

(2) The drum-dried, xanthan gum-modified tapioca starch product was added to the above formulation and kept in the refrigerator following cooking at 91° C. for 5 minutes. Viscosity=4150 cP*. Appearance was as follows:
 a. good pulpy texture
 b. little breakdown on cooking
 c. picked up red coloring from tomato paste
 d. after standing in refrigerator slightly more syneresis observed than in (1) preceding.

* Measured on LVF viscometer, 60 rpm, No. 3 spindle

EXAMPLE 3

Properties of Gum-Modified Starch vs. Simple Combination of Gum and Precursor Starch A 1:25 ratio of xanthan gum-unmodified tapioca starch was prepared as in Example 1, B). The resulting xanthan gum-modified tapioca starch (1) was compared with xanthan gum and unmodified tapioca starch drum dried separately and then combined in a 1:25 ratio (2) and with drum-dried unmodified tapioca starch (3). The following observations and viscosity data (Table III) were obtained which show the heat stability of the gum-modified starch of this invention.

TABLE III

Gum-Modified Starch Vs. Gum and Starch Vs. Starch

| Description of Drum-Dried Product | Initial Viscosity (cP)* | Viscosity (cP) After 40 min. (71°–82° C.) | Viscosity (cP) After 40 min. heating & cooled to room temperature | Comments |
|---|---|---|---|---|
| 1. Co-drum-dried xanthan gum/unmodified tapioca starch (tested 3% sol'n with 7.5% sugar No. 2 spindle) (thru 200 mesh) | 340 | 140 | 324 | Short, non-gummy, slightly grain, heat stable, similar to a pregelatinized chemically modified starch in texture and heat stability |
| 2. Xanthan gum and unmodified tapioca starch drum dried separately and then combined (tested 3% sol'n with 7.5% sugar, No. 2 spindle) (thru 200-mesh) | 215 | 48 | 135 | Long, gummy, snotty, not heat stable |
| 3. Drum-dried unmodified tapioca starch (3% sol'n with 7.5% sugar, No. 2 spindle) (thru 200-mesh) | 87 | 25 | 57 | Long, gummy, snotty, not heat stable |

*Viscosity measured on Brookfield LVF Viscometer, 60 rpm

Fine-mesh 1:25 drum dried xanthan gum-modified starches were tested for viscosity (Table IV) and appearance in the following formulation:

Instant Vanilla Pudding (Dry Mix)

| Ingredients | Percent |
|---|---|
| Sugar (Baker's fine) | 70.19 |
| Dextrose | 8.79 |
| Tetrasodium pyrophosphate | 2.38 |
| Salt | 1.11 |
| Disodium pyrophosphate | 1.20 |
| Starch or xanthan/starch products | 16.38 |
| | 100.05 |

Procedure

1. Place ingredients in ribbon blender, or suitable mixer, and mix until homogeneous.
2. To prepare finished pudding:
   a. Place 1 pint of milk from refrigerator in mixing bowl and add 3¾ ounces dry mix while agitating.
   (b). Continue agitation one to 1½ minutes at low speed on electric mixer.
   c. Place pudding in cups and refrigerate.

Observations

The co-drum-dried xanthan gum-unmodified starch had a slightly slower initial hydration rate when compared with commercially available fine-mesh, pregelatinized, modified starch, set after 5 minutes, and had a very short smooth appearance. In addition, comments summarized from a taste panel consisting of 6 people rated the xanthan gum-modified starch and commercially available starch puddings as close in texture, body, and mouthfeel.

TABLE IV

| Sample Description | Helipath Viscosity (cP). (5 rpm, #C Spindle) Readings | | | |
|---|---|---|---|---|
| | 15 min. | 30 min. | 45 min. | 60 min. |
| A. Control - Redisol 88 (pregelatinized modified tapioca starch 200-mesh) | 64,000 | 82,000 | 98,000 | 110,000 |
| B. Drum-dried xanthan gum, unmodified tapioca starch (1:25 ratio, 200-mesh) | 72,000 | 92,000 | 108,000 | 115,200 |

EXAMPLE 4

Time And Temperature Parameters

To identify the constraints imposed by time and temperature and following tests for viscosity and appearance were performed. The 1:25 xanthan gum/unmodified starch was prepared according to Example 1, B, except that the steam pressure was dropped to 4 psi. The temperature was about 104° C. The product was collected, milled, and screened through 200-mesh and divided into two test batches.

Batch No. 1: was used as is in the following formulation.
Batch No. 2: was placed in an oven for 25 minutes at 149° C. and then used in a hot fill canned fruit-flavored pudding formulation.

Hot-filled Fruit-Flavored Pudding

| Ingredients | Weight (g) |
|---|---|
| Water | 660 |
| Sugar | 232 |
| Starch | 60 |
| Coconut Fat (m.p. 33° C.) | 40 |
| Emplex ® (sodium stearoyl-2-lactylate) | 2 |
| Citric Acid | 2 |

-continued

| Hot-filled Fruit-Flavored Pudding | |
|---|---|
| Ingredients | Weight (g) |
| Salt | 2 |

All ingredients were slurried at medium speed on a variable speed electric mixer. The measured pH=2.8. The mixture was cooked in an open kettle at 91° C. for 5 minutes then hot-fill canned and sealed. The inverted sealed can was allowed to cool to room temperature.

Results

Batch No. 1: This unheated batch used in the pudding was long and stringy and in appearance was similar to the xanthan gum/unmodified starch solutions in which the components were drum dried separately (Example 3). Gelation occurred on cooling.

| | | |
|---|---|---|
| Viscosity | = | 4200 cP (Brookfield LVF, 60 rpm, |
| | = | 12,000 cP (Helipath viscometer 5 rpm). |

Batch No. 2: The heated bath as used in the pudding was thinner initially when hot. As it cooled, the pudding set up slowly and was smooth and not stringy. (It appeared that a further cross-linking type reaction had taken place by 25 minutes heating at 149° C.). After standing, the pudding made with Batch No. 2 was much thicker, had a short, smooth, and nice heavy appearance similar to a pie filling. The pudding had a pie-filling appearance rather than a gelled appearance. No gelation occurred on cooling.

| | | |
|---|---|---|
| Viscosity | = | 10,000 cP (Brookfield LVF, 60 rpm) |
| | = | 66,000 cP (Helipath Viscometer, 5 rpm) |

This example illustrates that a longer heating time can compensate for a lower temperature.

EXAMPLE 5

Xanthan Gum Modification in Presence of Other Gums

The procedure described in Example 1 (A) was also applied to a xanthan gum, locust bean gum blend.

| Heat and Shear Stability (Test 3) | | |
|---|---|---|
| Description of Drum-Dried Product | Hydrated Product Retained on 20-mesh Screen | Comments |
| Xanthan gum, locust bean gum, unmodified tapioca starch (0.5:0.5:5 ratio, through 14-, on 20-mesh) | 185 g | Applesauce-like texture, semi-firm particles, fairly nice texture. |

Observations

A blend of xanthan gum and locust bean gum co-drum-dried with the precursor starch imparted heat and shear stability comparable to that of xanthan gum drum dried with precursor starch, thus indicating the xanthan gum as the active component in blend that is not inhibited by addition of another gum.

EXAMPLE 6

Xanthan Gum Modification of Modified and Pre-Gelatinized Starches

The following data (Tables V and VI) were obtained in which xanthan gum was blended with various modified and pregelatinized precursor starches and prepared as in Example 1 A.

TABLE V

| Heat and Shear Stability Test | | |
|---|---|---|
| Description of Drum-Dried Product | Hydrated Product Retained on 20-mesh Screen | Comments |
| Xanthan/Freezist M* starch (cross-linked Tapioca Starch) (1:5 ratio, thru 14, on 20-mesh) | 70 g | Soft texture, most of the gum starch mixture hydrated went into solution and was washed off screen. Mushy. |
| Xanthan/Shur-Fill 327* starch (waxy maize starch no crosslinking) (1:5 ratio, thru 14 on 20-mesh) | 196 g | Applesauce like appearance, semi-firm particles, but not real crisp. |
| Xanthan/Consista* starch (low crosslinked waxy maize starch) (1:5 ratio, thru 14, on 20 mesh) | 122 g | Applesauce like, soft to sem-crisp texture. |
| Xanthan/Rezista* starch (medium crosslinked waxy maize starch) (1:5 ratio, thru 14, on 20-mesh) | 179 g | Applesauce like texture, good firm particles. Particles have nicer texture, not as soft. |
| Xanthan/TNT 99* starch (high crosslinked waxy maize starch) (1:5 ratio, thru 14, on 20-mesh) | 85 g | Fairly soft particles. |
| Xanthan/Gelatinized Dura-Gel* Starch (pregelatinized, cross-linked waxy maize starch) | 62 g | Very soft mushy particles, most of mixture hydrated went into solution. |

*From A. E. Staley Mfg. Co.

TABLE VI

| Cold Water Hydration Rate and Swelling Power Test | | |
|---|---|---|
| Description of Drum-Dried Product | Hydrated Product Retained on 20-Mesh Screen | Comments |
| Xanthan/Freezist M starch (crosslinked tapioca starch) (1:5 ratio, thru 14, on 20-mesh) | 171 g | Good firm crisp texture, like applesauce. |
| Xanthan/Shur-Fill 327 starch (no crosslinking) (1:5 ratio, thru 14, on 20-mesh) | 190 g | Crisp. |
| Xanthan/Consista starch (low cross-linked waxy maize starch) (1:5 ratio, thru 14, on 20-mesh) | 171 g | Good firm crisp texture. |

TABLE VI-continued

| Description of Drum-Dried Product | Cold Water Hydration Rate and Swelling Power Test | |
|---|---|---|
| | Hydrated Product Retained on 20-Mesh Screen | Comments |
| Xanthan/Rezista starch (medium crosslinked waxy maize starch) (1:5 ratio, thru 14, on 20-mesh) | 132 g | Crispy. |
| Xanthan/TNT 99 starch (high crosslinked waxy maize starch) (1:5 ratio, thru 14, on 20-mesh) | 172 g | Crispy. |
| Xanthan/Gelatinized Dura-Gel starch (Pregelatinized, crosslinked waxy maize starch) | 169 g | Semi-firm, good texture. |

The results (Tables V and VI show that the effectiveness of the gum interaction with modified precursor starches decreased with increasing crosslinking levels. Modified precursor starches with low or no crosslinking interacted with xanthan gum well. This may be attributed to the tighter bonding on the precursor starch granules which restricts the opening (cook-out) of granules to interact with xanthan gum during the drum-drying process.

The results also show that substituents such as acetyl and hydroxypropyl in the precursor starches do not hinder the interaction with xanthan gum.

What is claimed is:

1. A process for preparing xanthan gum-modified starch comprising
   a. preparing an aqueous mixture of xanthan gum and precursor starch, where the xanthan gum to precursor starch ratio ranges from 1:100 to 1:1,
   b. heating said mixture below 100° C. to effect gelatinization of the precursor starch where the heating is continued until the moisture content of the mixture is below 10%, and then
   c. drying said heated mixture between 138°–176° C. for at least fifteen seconds in an oven or extruder.

* * * * *